Oct. 5, 1954  C. P. SEDLOCK  2,690,786
TRUCK SEAT AND MOUNTING THEREFOR
Filed April 9, 1952  3 Sheets-Sheet 1
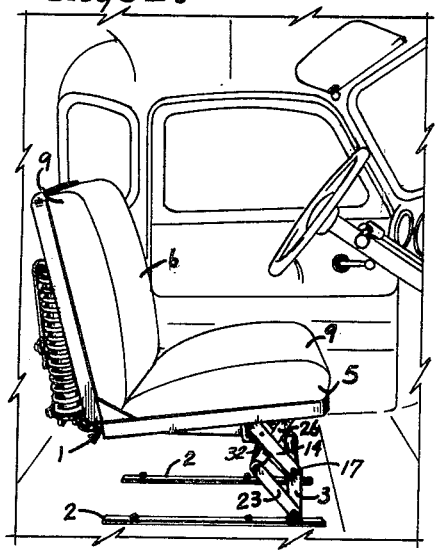
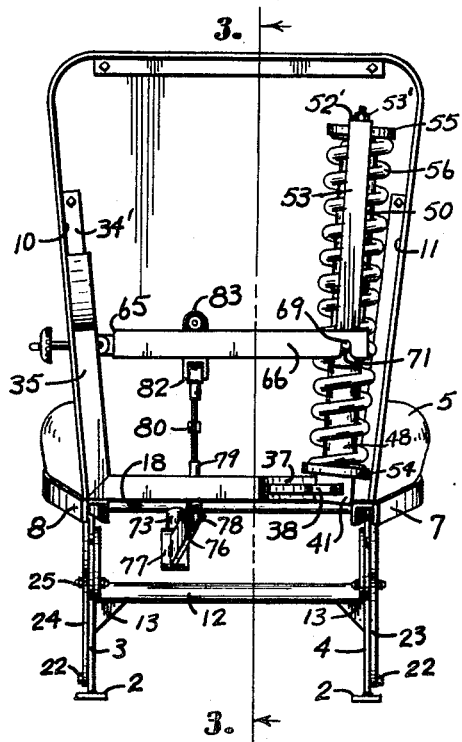
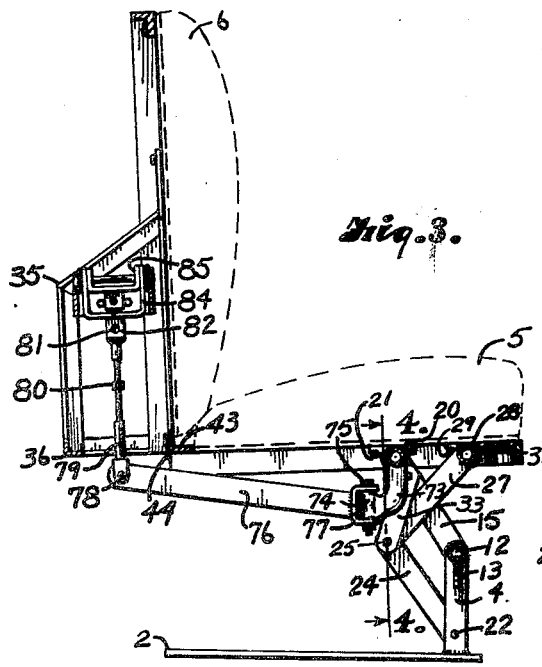
INVENTOR.
Carl P. Sedlock.
BY
Fishburn & Mullendore
ATTORNEYS.

Oct. 5, 1954
C. P. SEDLOCK
2,690,786
TRUCK SEAT AND MOUNTING THEREFOR
Filed April 9, 1952
3 Sheets-Sheet 2
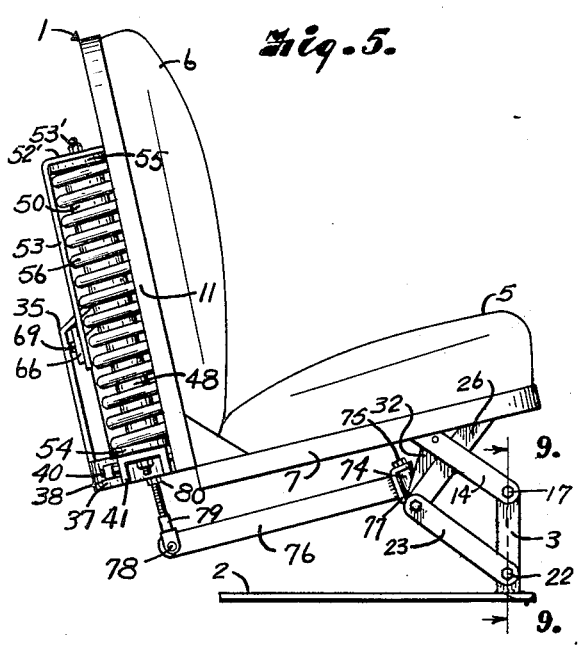
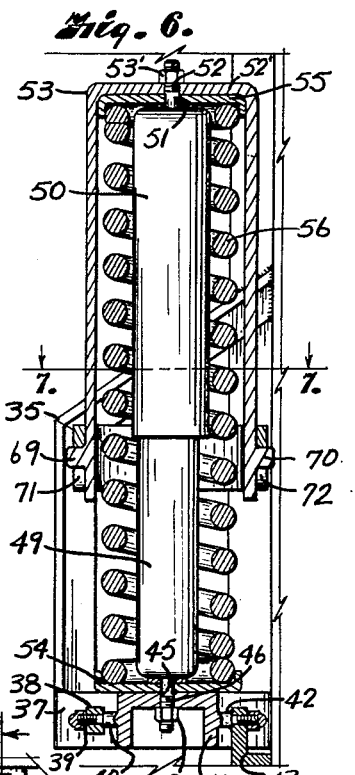
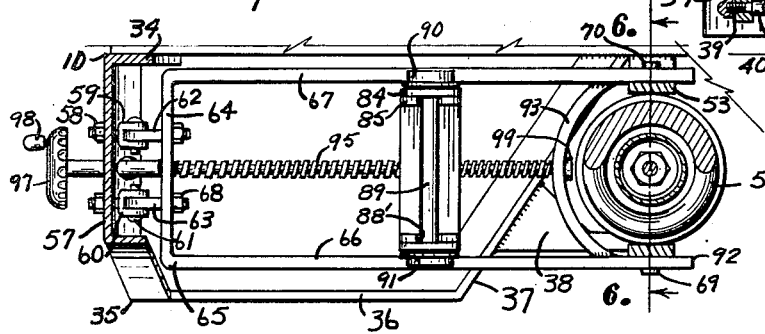
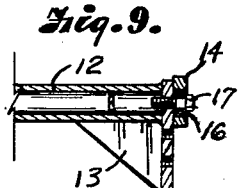
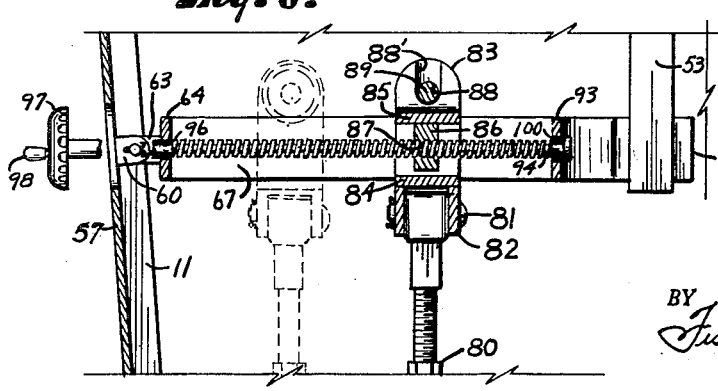
INVENTOR.
Carl P. Sedlock.
BY
Fishburn Mullendore
ATTORNEYS.

Oct. 5, 1954     C. P. SEDLOCK     2,690,786
TRUCK SEAT AND MOUNTING THEREFOR
Filed April 9, 1952     3 Sheets-Sheet 3
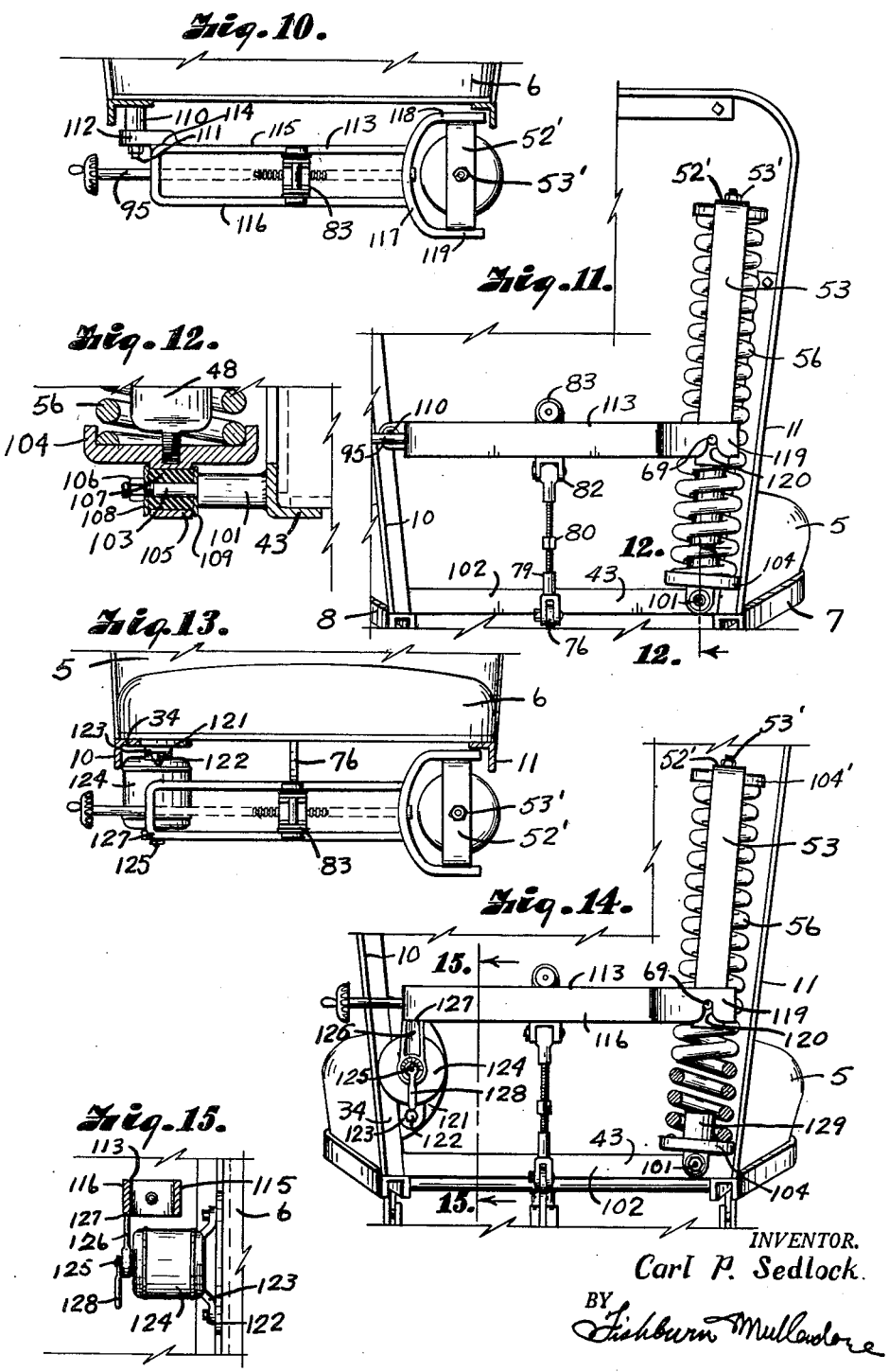
INVENTOR.
Carl P. Sedlock.
BY Fishburn Mullaore
ATTORNEYS.

Patented Oct. 5, 1954

2,690,786

UNITED STATES PATENT OFFICE 2,690,786

TRUCK SEAT AND MOUNTING THEREFOR

Carl P. Sedlock, Kansas City, Mo.

Application April 9, 1952, Serial No. 281,417

13 Claims. (Cl. 155—9)

This invention relates to a seat and mounting therefor and is particularly adapted for use in trucks, tractors and other vehicles.

More particularly the invention relates to a mounting and support for seats for trucks, tractors and the like wherein the seat is substantially rearwardly of the mounting member to pivotally and resiliently suspend the seat above the support.

Heretofore in devices of this character, it has been the practice to mount the seat ahead of the mounting elements, and due to the particular construction of the type of truck and tractor, it has been the practice to mount the resilient means directly on the support wherein the shock from the tractors and trucks will be directly imported to the driver. This invention contemplates an improved mounting and support to provide easier riding for the operator of the vehicle.

The principal objects of the present invention are to provide a seat mounted upon a base having three pivot points of suspension at the forward end of the seat directly to the forward end of the support; to provide means for securing the pivoted mounting means to the support for the seat; to provide a double acting shock absorber and spring unit at the back of the seat and vertically thereof and means for mounting the same; to provide a U-shaped bracket hingedly connected to one side of the frame of the back of the chair and having its other end connected to trunnions forming a part of the framework over the upper part of the shock absorber unit, the U-shaped bracket member forming trackways for a carriage movable thereon; to provide an adjustable connecting rod for such carriage and an arm pivotally mounted to a shaft underneath the seat and to which the pivotal mounting members are attached; to provide a threaded rod having crank means cooperating with the carriage and the U-shaped bracket for moving the carriage on said trackways to adjust the tension of the seat to accommodate different weight persons, said threaded rod having an inner end connected to the framework for the spring; and to provide a device of this character of simple construction and efficient in operation.

In accomplishing these and other objects of the present invention, I have provided improved detail of structure, the preferred forms of which are illustrated in the accompanying drawings, wherein:

Fig. 1 is a perspective view of my improved seat and mounting therefor shown in the cab of a truck or the like.

Fig. 2 is an elevational view taken from the back thereof.

Fig. 3 is a cross sectional view taken on a line 3—3, Fig. 2.

Fig. 4 is a fragmentary perspective view particularly illustrating the suspension mounting of the seat at the forward portion thereof.

Fig. 5 is a side elevational view of the seat shown as it would be with a driver's weight thereon.

Fig. 6 is a cross sectional, elevational view of the double acting shock absorber and spring member and mounting, taken on a line 6—6, Fig. 7.

Fig. 7 is a plan view of the brackets and carriage mechanism for adjusting the resiliency of the seat, taken on a line 7—7, Fig. 6.

Fig. 8 is a cross sectional view through the carriage mechanism particularly illustrating the adjustability thereof.

Fig. 9 is a fragmentary cross sectional view particularly illustrating the mounting of the links and arm to the support, taken on a line 9—9, Fig. 5.

Fig. 10 is a fragmentary plan view of a modified form of the invention particularly illustrating the mounting of the spring shock absorber.

Fig. 11 is a fragmentary elevational view taken from the back of the seat.

Fig. 12 is a cross sectional view taken on the line 12—12, Fig. 11.

Fig. 13 is a fragmentary plan view of a still further modified form of the mounting of the spring shock absorber on the seat.

Fig. 14 is a fragmentary elevational view taken from the back of the seat.

Fig. 15 is a cross sectional view taken on a line 15—15, Fig. 14.

Referring more in detail to the drawings:

1 designates a seat construction for trucks, tractors or the like embodying the features of my invention comprising a base consisting of two parallel members 2 having uprights or standards 3 and 4 near their forward ends. 5 designates the seat portion of the chair and 6 the back therefor. A framework is provided for the seat comprising sides 7 and 8 of channel shape providing a base upon which the cushion 9 of the seat rests. The frame for the back consists of side members 10 and 11 of angle shape.

Mounted on the upper end of the uprights 3 and 4 by welding or other suitable means is a cross bar 12 having gussets 13 for adding strength to the structure. A pair of arms 14 and 15 are pivotally mounted on the outside of the upper ends of the standards 3 and 4 and having their lower ends bored and provided with bearings 16. The upper ends of the standards 3 and 4 are provided with threaded openings, and the ends of the arms are secured thereto by bolts 17. The upper ends of the arms are rigidly secured, by welding or other suitable means, to a shaft 18. The upper ends of the arms 14 and 15 are trunnioned and have bearing in bearing housings 20 which are secured to the side rails 7 and 8 by bolts or the like 21.

Pivotally secured to and near the lower end of the standards 3 and 4 by bolts or the like 22 are arms 23 and 24 which extend in substantially the same directions as the arms 14 and 15 and have both ends bored and provided with bearings.

Pivotally mounted to the upper ends of the arms 23 and 24 by bolts or the like 25 are arms 26 and 27 having their upper ends rigidly secured to a shaft 28. Secured to the respective sides of the side members 7 and 8 forwardly of the bearings 19 and 20 by bolts or the like 29 are bearing housings 30 and 31. The upper ends of the arms 26 and 27 are trunnioned bearing in the bearing housings 30 and 31.

Pivotally secured to the upper ends of the arms 23 and 24 and the lower ends of the arms 26 and 27, by studs 25 mounted in the arms 26 and 27, are links 32 and 33 having their upper ends pivotally secured by bolts or the like 34 to arms 14 and 15 at a point below the upper ends of said arms as best illustrated in Figs. 3 and 4 for regulating the angle of the descent of the seat. Both ends of the links 32 and 33 are bored and are provided with bearings.

The side members 11 of the back are angle-shaped as indicated at 34' and secured thereto by welding or other suitable means is a frame structure 35 comprising angle-shaped members 36, the upper end of the frame being inclined upwardly as indicated best in Fig. 3.

Welded to the side 37 of the framework structure is a bracket 38 provided with an opening 39 to accommodate a trunnion 40 rigidly secured to a U-shaped bracket 41, as best illustrated in Figs. 5 and 7. The bracket 41 has a trunnion 42 pivotally mounted to an angle member 43 secured to the lower end of the back of the framework as indicated at 44, Fig. 3.

The bracket 41 is U-shaped and provided with an opening 45 adapted to receive a pin 46 held therein by a nut 47, the pin being secured to the lower portion 48 of a double action shock absorber 49. The upper end 50 of the shock absorber has an outwardly extending pin 51 which extends through an opening 52 in the end 52' of a U-shaped bracket 53 and is held therein by a nut 53'. Located in the respective ends of the shock absorbers are seat members 54 and 55 for receiving the respective ends of a coil spring 56 as best illustrated in Fig. 6.

One side of the framework 35 is provided with a plate 57 and mounted in the sides thereof by bolts or the like 58 are spaced ears 59 and 60. Secured to the ears 59 and 60 by pins or the like 61 are spaced arms 62 and 63 secured to the end 64 of a U-shaped member 65 having arms 66 and 67 for a purpose later described. The arms 62 and 63 extend through openings in the end 64 of the U-shaped member and are secured thereto by nuts or the like as indicated at 68 so that the U-shaped member is pivotally or hingedly mounted to the plate 57 of the frame 35.

The U-shaped member 53 is provided near its lower end with trunnions 69 and 70. The inner ends of the arms 66 and 67 of the hinged U-shaped member are provided with slots 71 and 72 which are adapted to receive and engage over the trunnions 69 and 70 for a purpose later described.

The cross shaft 18 is provided with a downwardly extending arm 73 and the arm is turned and extends rearwardly and is provided with a knuckle bearing 74 for receiving a bolt 75 for pivotally securing a link or arm 76 thereto, the end of the link having ears 77 for engaging the bearing 74. The arm 76 extends rearwardly and is provided with an opening for receiving a pin 78 to pivotally mount a connecting rod 79 having a turnbuckle 80. The upper end of the connecting rod 79 is connected by a pin 81 to ears 82 of a carriage 83.

The carriage 83 comprises a U-shaped member 84 and mounted therein is a second U-shaped member 85 having a depending block 86 having a threaded opening 87 as best illustrated in Fig. 8. The U-shaped bracket 84 is provided with openings 88 and the bracket 86 with slots 88' at their respective ends thereof for accommodating a shaft 89 having its end extending outwardly from the U-shaped brackets and mounted on such ends are wheels or rollers 90 and 91 for engaging the upper edges of the arms 66 and 67 of the U-shaped member 65, the arms forming a trackway for the roller.

Spaced inwardly from the ends 92 of the U-shaped member 65 and secured thereto by welding or other suitable means is a circular shaped plate 93 having an opening 94 substantially the center thereof adapted to receive the end of a threaded rod 95 which extends through the opening 87 in the carriage 83, through the end 64 of the U-shaped member, and through the plate 57 and is provided on the outer end with a knob 97 having a handle 98. The inner end of the rod 95 is provided with an enlarged end 99. The openings 94 and 96 are larger than the rod so that the enlarged end of the rod may be inserted therethrough. A bushing or the like 100 may be compressed into the opening 94 to retain the rod in engagement with the plate 93.

The slots 88' in the U-shaped bracket 85 prevent binding of the shaft 89 and the threaded rod 95 when operating the device as later described.

The base members 2 may be fastened to the floor of the truck or other vehicle by screws, bolts or the like as desired.

Operation of a device constructed and assembled as described is as follows:

When the operator of the vehicle assumes his position on the seat, his weight will cause downward and rearward motion of the seat due to the pivotal mounting of the arms 14 and 15, 23 and 24, 26 and 27, and links 33 and 34. While the rear end of the arms 14 and 15 are moving downwardly, they will also swing rearwardly, thus pulling the seat slightly to the rear, the arms 14 and 15, and 23 and 24 changing position in regard to the parallel as the seat moves downwardly. As the seat moves downwardly the shaft 18 will turn at the same angle as the arms 14 and 15, thus causing the knuckle 74 on the end thereof to move forwardly and downwardly, also at the same angle as the arms 14 and 15, which in turn causes the link or arm 76 to move downwardly pulling the carriage 83 downwardly which in turn will cause downward movement of the inner ends 92 of the arms 66 and 67 downwardly exerting pressure on the coil spring 56 and the shock absorbers 49 to provide resiliency to the entire structure.

As the vehicle goes over rough terrain any jolt or jog will be taken up in the pivotal mounting of the seat by the connections to the side near the front of the seat, and the shock absorber will have double action to cushion the effects of such strain, which permits the operator of the vehicle to ride in comfort.

To adjust the seat for operators of different weight, the threaded rod 95 is manipulated to move the carriage 83 on the U-shaped member 65; for example, to accommodate a person of light weight, the carriage is moved on the trackway towards the coil spring arrangement and for heavy weight persons the carriage is moved to the rear of the structure as shown in dotted lines, Fig. 8. The carriage is manipulated by turning of the handle 98 on the end of the rod. In order to hold the connecting rod 80 in substantially vertical position, the link 76 is pivotally mounted to the knuckle member 74 thus allowing the link member to move transversely of the structure in reference to the carriage.

It will be noted that the depending arm 73 is mounted to one side farthest away from the spring member to accommodate heavy persons by reducing torque on the connecting rod.

In Figs. 10, 11 and 12 there is shown a modified form of mounting for the double action shock absorber wherein a stud 101 is mounted by welding or otherwise rigidly securing it to the angle member 43 of the rear portion 102 of the frame for the seat member, which extends rearwardly from the seat and has a reduced portion forming a pin 103 for mounting of a seat member 104 for the spring 56 and shock absorber 49. The seat member 104 has a bearing portion 105 pivotally mounted on the pin 103 and held thereon by a nut 106. A rubber bearing 107 is provided on the pin 103 and held in place by washers 108 and 109.

The double acting shock absorber has the same construction as shown in the preferred form of the invention and is given like numbers in the drawings.

Secured to the side member 10 on the back of the seat by welding or other suitable means is a stud 110 having a threaded reduced portion 111 adapted to receive and pivotally mount a bracket arm 112 having ears welded to a U-shaped member 113 as indicated at 114. The U-shaped member is of the same form and accomplishes the same purpose as the U-shaped member 65 in the preferred form of the invention except that it is narrower in width and has arms 115 and 116 forming trackways for the carriage 83 which is the same construction as shown in the preferred form of the invention, except that it is narrower to fit the U-shaped member 113 and is given like numbers. The connecting rod 79 is also of the same construction as that shown in the preferred form and is given like numbers.

The inner ends of the arms 115 and 116 are welded or otherwise secured to a bracket 117 having arms 118 and 119 provided with slots 120 for engaging the trunnions 69 and 70 on the U-shaped member 53 as illustrated in the preferred form of the invention. The connecting rod 79 is secured to the carriage and has its lower end secured to the arms 76 as particularly illustrated in Fig. 3 of the preferred form of the invention.

The threaded rod 95 is also provided as in the preferred form of the invention for moving the carriage on the arms 115 and 116 of the U-shaped member 113.

In this form of the invention, it will be noted that the operation of the double acting shock absorber is substantially the same as the preferred form, but a more simple arrangement is provided for pivotally mounting the U-shaped member 113 on the back of the seat thus eliminating the sub-framework structure 35, and by adjusting the carriage on the arms of the U-shaped member through the rod 95 the device is adapted to accommodate persons of different weights.

In the form of the invention illustrated in Figs. 13, 14 and 15, the spring 56 is mounted identically the same as shown in Figs. 10, 11 and 12 and is given like numbers on the drawings. The difference in the form of the invention shown in Figs. 13, 14 and 15 is in the mounting of the end of the U-shaped member 113 on the side member 10. This is accomplished by welding or otherwise securing a plate 121 to the flange 34 of the side member 10, and mounted thereon by bolts 122 are bracket arms 123 of a rotary type shock member 124. This shock member is of the usual type commonly used with racing cars or the like and has a shaft 125 extending outwardly of one end thereof, and pivotally mounted thereon is an arm 126 having its free ends welded or otherwise suitably secured to the end 127 of the U-shaped member 113.

This form of the invention includes the carriage mounted on the arms of the U-shaped member and the connecting rods connected with the arms 76 of the seat structure and the parts are given like numbers to those in the preferred form of the invention.

The rotary type shock member has an adjusting lever 132 for adjusting tension on the shock and also for locking the shock to hold the seat rigid if so desired. In operation of this form of the invention, the carriage may be adjusted on the arms 111 and 112 and the U-shaped member 113 the same as in the preferred form of the invention, and the U-shaped member will pivot on the double acting shock member which is mounted to the frame so that the action is the same as in the preferred form of the invention. Cylindrical keepers 129 may be secured in the seat members 104 and 104' to hold the spring in place as indicated best in Fig. 14.

It will be obvious from the foregoing that I have provided an improved mounting for truck seats or the like in which the structure may be adjusted to adjust the same weight of the operator of the vehicle and absorb shock from rough terrain.

What I claim and desire to secure by Letters Patent is:

1. A seat for a vehicle comprising, a base including spaced uprights, a frame for said seat having side rails and a back, said back including side rails, an upper and lower pair of arms pivotally secured to said uprights, said pairs extending upwardly of said uprights in substantially the same direction, a pair of arms pivotally mounted on the upper ends of the arms of the lower pair and having their upper ends extending forwardly and pivotally connected to the side rails of the seat frame near the forward ends thereof, the upper ends of the upper pair of arms being pivotally connected to the side rails of the seat frame at points spaced rearwardly of the pivotal connection of the forwardly extending arms, a pair of link members having their lower ends pivotally connected to the upper ends of the lower pair of rearwardly extending arms and having their upper ends pivotally connected to the upper pair of rearwardly extending arms at points spaced from the upper ends thereof, a shaft rigidly secured to the upper ends of the upper pair of arms, an arm extending downwardly and rearwardly from said shaft, a shock absorber, means mounting said shock absorber on the frame of the back member of the seat including a frame member having a plate on one side thereof, a U-shaped member pivotally connected to said plate, said U-shaped member having arms pivotally connected with said shock absorber, and means carried by said U-shaped member and having connection with said downwardly and rearwardly extending arm whereby the downward and rearward movement of said seat will cause said arms of the U-shaped member to exert pressure on the shock absorber to cause resilient action on said seat.

2. A seat for a vehicle comprising, a base including spaced uprights, a frame for said seat having side rails and a back, said back including side rails, an upper and a lower pair of arms pivotally secured to said uprights, said pairs extending upwardly of said uprights in substantially the same direction, a pair of arms pivotally mounted on the upper ends of the arms of the lower pair and having their upper ends extending forwardly and pivotally connected to the side rails of the seat frame near the forward ends thereof, the upper ends of the upper pair of arms being pivotally connected to the side rails of the seat frame at points spaced rearwardly of the pivotal connection of the forwardly extending arms, a pair of link members having their lower ends pivotally connected to the upper ends of the lower pair of rearwardly extending arms and having their upper ends pivotally connected to the upper pair of rearwardly extending arms at points spaced from the upper ends thereof, a shaft rigidly secured to the upper ends of the upper pair of arms, an arm extending downwardly and rearwardly from said shaft, a shock absorber, means mounting said shock absorber on the frame of the back member of the seat including a frame having a plate on one side thereof, a U-shaped member pivotally connected to said plate, said U-shaped member having spaced arms extending across said back and being pivotally connected to said shock absorber at substantially the vertical center thereof, a carriage including rollers engaging said arms for moving said carriage along said arms, and means connecting said downwardly and rearwardly extending arm and said carriage whereby the downward and rearward movement of said seat will cause the arms of the U-shaped member to exert pressure on the shock absorber upon movement of said carriage.

3. A seat for a vehicle comprising, a base including spaced uprights, a frame for said seat having side rails and a back, said back including side rails, an upper and a lower pair of arms pivotally secured to said uprights, said pairs extending upwardly of said uprights in substantially the same direction, a pair of arms pivotally mounted on the upper end of the arms of the lower pair and having their upper ends extending forwardly and pivotally connected to the side rails of the seat frame near the forward ends thereof, the upper ends of the upper pair of arms being pivotally connected to the side rails of the seat frame at points spaced rearwardly of the pivotal connection of the forwardly extending arms, a pair of link members having their lower ends pivotally connected to the upper ends of the lower pair of rearwardly extending arms and having their upper ends pivotally connected to the upper pair of rearwardly extending arms at points spaced from the upper ends thereof, a shaft rigidly secured to the upper ends of the upper pair of arms, an arm extending downwardly and rearwardly from said shaft, a shock absorber, means mounting said shock absorber on the frame of the back member of the seat including a frame member having a plate on one side thereof, a U-shaped member pivotally connected to said plate, said U-shaped member having spaced arms extending across said back and being pivotally connected to said shock absorber at substantially the vertical center thereof, a carriage having rollers engaging said arms and movable thereon, means carried by said last-named frame member for moving said carriage along said arms, an arm extending rearwardly from the arm depending from said shaft, and a connecting rod between the rear end of said arm and said carriage whereby the downward and rearward movement of said seat will cause said rearwardly extending arm to move said connecting rod to cause the arms of the U-shaped member to exert pressure on the shock absorber upon vertical movement of said carriage.

4. A seat for a vehicle comprising, a base including spaced uprights, a frame for said seat having side rails and a back, said back including side rails, an upper and a lower pair of arms pivotally secured to said uprights, said pairs extending upwardly of said uprights in substantially the same direction, a pair of arms pivotally mounted on the upper end of the arms of the lower pair and having their upper ends extending forwardly and pivotally connected to the side rails of the seat frame near the forward ends thereof, the upper ends of the upper pair of arms being pivotally connected to the side rails of the seat frame at points spaced rearwardly of the pivotal connection of the forwardly extending arms, a pair of link members having their lower ends pivotally connected to the upper ends of the lower pair of rearwardly extending arms and having their upper ends pivotally connected to the upper pair of rearwardly extending arms at points spaced from the upper ends thereof, a shaft rigidly secured to the upper ends of the upper pair of arms, an arm extending downwardly and rearwardly from said shaft, a shock absorber, means mounting said shock absorber on the frame of the back member of the seat including a frame member having a plate on one side thereof, a U-shaped member pivotally connected to said plate and having arms pivotally connected to said shock absorber, a carriage movable on said arms, and means connecting said carriage with said rearwardly extending arm on said shaft to transmit movement of the seat to the carriage, whereby weight on the seat will exert downward pressure on said carriage to cause the shock absorber to cushion the load on said seat.

5. A seat for a vehicle comprising, a base including spaced uprights, a frame for said seat having side rails and a back, said back including side rails, means pivotally mounting said seat on said uprights near the forward edge of said seat, said means including a shaft pivotally mounted underneath said seat, an arm extending downwardly and rearwardly from said shaft, a shock absorber, means mounting said shock absorber on the frame of the back member of the seat including a frame member having a plate on one side thereof, a U-shaped member pivotally connected to said plate, said U-shaped member having spaced arms extending across said back and being pivotally connected to said shock absorber at substantially the vertical center thereof, a carriage having rollers engaging said arms and movable thereon, means carried by said last-named frame member for moving said carriage along said arms, an arm extending rearwardly from the arm depending from said shaft, and a connecting rod between the rear end of said rearwardly extending arm and said carriage whereby the downward and rearward movement of said seat will cause said rearwardly extending arm to move said connecting rod to cause the arms of the U-shaped member to exert pressure on the shock absorber upon movement of said carriage.

6. A seat for a vehicle comprising, a base including spaced uprights, a frame for said seat having side rails and a back, said back including side rails, means pivotally mounting said seat on said uprights near the forward edge of said seat, said means including a shaft pivotally mounted underneath said seat, an arm extending downwardly and rearwardly from said shaft, a shock absorber, means mounting said shock absorber on the frame of the back member of the seat including a frame member having a plate on one side thereof, a U-shaped member pivotally connected to said plate, said U-shaped member having spaced arms extending across said back and being pivotally connected to said shock absorber at substantially the vertical center thereof, a carriage having rollers engaging said arms and movable thereon, an arm extending rearwardly from the arm depending from said shaft, a connecting rod between the rear end of said rearwardly extending arm and said carriage whereby the downward and rearward movement of said seat will cause said rearwardly extending arm to move said connecting rod to cause the arms of the U-shaped member to exert pressure on the shock absorber upon movement of said carriage, and means carried by said plate of the frame member and U-shaped member cooperating with said carriage for moving said carriage on said arms.

7. A seat for a vehicle comprising, a base including spaced uprights, a frame for said seat having side rails and a back, said back including side rails, an upper and a lower pair of arms pivotally secured to said uprights, said pairs extending upwardly of said uprights in substantially the same direction, a pair of arms pivotally mounted on the upper end of the arms of the lower pair and having their upper ends extending forwardly and pivotally connected to the side rails of the seat frame near the forward ends thereof, the upper ends of the upper pair of arms being pivotally connected to the side rails of the seat frame at points spaced rearwardly of the pivotal connection of the forwardly extending arms, a pair of link members having their lower ends pivotally connected to the upper ends of the lower pair of rearwardly extending arms and having their upper ends pivotally connected to the upper pair of rearwardly extending arms at points spaced from the upper ends thereof, a shaft rigidly secured to the upper ends of the upper pair of arms, an arm extending downwardly and rearwardly from said shaft, a shock absorber, means mounting said shock absorber on the frame of the back member of the seat including a frame member having a plate on one side thereof, a U-shaped member pivotally connected to said plate, said U-shaped member having spaced arms extending across said back and being pivotally connected to said shock absorber at substantially the vertical center thereof, a carriage having rollers engaging said arms and movable thereon, an arm extending rearwardly from the arm depending from said shaft, a connecting rod between the rear end of said rearwardly extending arm and said carriage whereby the downward and rearward movement of said seat will cause said rearwardly extending arm to move said connecting rod to cause the arms of the U-shaped member to exert pressure on the shock absorber upon vertical movement of said carriage, and means carried by said U-shaped member cooperating with said carriage for moving said carriage to and away from said shock absorber to accommodate different weights on said seat.

8. A seat for a vehicle comprising, a base including spaced uprights, a frame for said seat having side rails and a back, said back including side rails, an upper and a lower pair of arms pivotally secured to said uprights, said pairs extending upwardly of said uprights in substantially the same direction, a pair of arms pivotally mounted on the upper ends of the arms of the lower pair and having their upper ends extending forwardly and pivotally connected to the side rails of the seat frame near the forward ends thereof, the upper ends of the upper pair of arms being pivotally connected to the side rails of the seat frame at a point spaced rearwardly of the pivotal connection of the forwardly extending arms, a pair of link members having their lower ends pivotally connected to the upper ends of the lower pair of rearwardly extending arms and having their upper ends pivotally connected to the upper pair of rearwardly extending arms at a point spaced from the upper ends thereof, a shaft rigidly secured to the upper ends of the upper pair of arms, an arm extending downwardly and rearwardly from said shaft, a shock absorber, means mounting said shock absorber on the frame of the back member of the seat including a frame member having a plate on one side thereof, a U-shaped member pivotally connected to said plate, said U-shaped member having spaced arms extending across said back and being pivotally connected to said shock absorber at substantially the vertical center thereof, a bracket connecting the inner ends of said arms, a carriage having rollers engaging said arms and movable thereon, the cross arm of said U-shaped member and said plate having openings therein and said carriage having a block provided with a threaded opening, a threaded rod having a handle on one end extending through said openings and having its free end engaging said bracket on said shock absorber for moving said carriage on said arms, an arm extending rearwardly from the arm depending from said shaft, and an adjustable connecting rod between the rear end of said rearwardly extending arm and said carriage whereby the downward and rearward movement of said seat will cause said rearwardly extending arm to move said connecting rod to cause the arms of the U-shaped member to exert pressure on the shock absorber upon vertical movement of said carriage.

9. A seat for a vehicle comprising, a base including spaced uprights, a frame for said seat having side rails and a back, said back including side rails, means pivotally mounting said seat on said uprights near the forward edge of said seat, said means including a shaft pivotally mounted underneath said seat, an arm extending downwardly and rearwardly from said shaft, a shock absorber, means pivotally mounting said shock absorber on the frame of the back of the seat, a U-shaped member, means pivotally mounting said U-shaped member to one of the side rails of the back of said seat, said U-shaped member having arms extending toward said shock absorber, means pivotally connecting said arms to said shock absorber at substantially the vertical center thereof, a carriage having rollers engaging the arms on said U-shaped member and movable thereon, means moving the carriage on said arms, means connecting said carriage to said shaft whereby downward and rearward movement of said seat will cause said last named means to exert pressure on said carriage to cause the arms of the U-shaped member to exert pressure on the shock absorber.

10. A seat for a vehicle comprising, a base including spaced uprights, a frame for said seat having side rails and a back, said back including side rails, means pivotally mounting said seat on said uprights near the forward edge of said seat, said means including a shaft pivotally mounted underneath said seat, an arm extending downwardly and rearwardly from said shaft, a shock absorber, means pivotally mounting said shock absorber on the frame of the back of the seat, a U-shaped member, means pivotally mounting said U-shaped member to one of the side rails of the back of said seat, said U-shaped member having arms extending toward said shock absorber, means pivotally connecting said arms to said shock absorber at substantially the vertical center thereof, a carriage having rollers engaging the arms on said U-shaped member and movable thereon, means moving the carriage on said arms, an arm extending rearwardly from the arm depending from said shaft, a connecting rod between the rear end of said rearwardly extending arm and said carriage whereby downward and rearward movement of said seat will cause said rearwardly extending arm to move said connecting rod to cause the arms of the U-shaped member to exert pressure on the shock absorber.

11. A seat for a vehicle comprising, a base including spaced uprights, a frame for said seat having side rails and a back, said back including side rails, means pivotally mounting said seat on said uprights near the forward edge of said seat, said means including a shaft pivotally mounted underneath said seat, an arm extending downwardly and rearwardly of said shaft, a shock absorber, means pivotally mounting said shock absorber on the frame of the back of the seat, a U-shaped member, a stud secured to one of said side rails on said back, means pivotally mounting said U-shaped member to said stud, said U-shaped member having arms extending toward said shock absorber, means pivotally connecting said arms to said shock absorber at substantially the vertical center thereof, a carriage having rollers engaging the arms on said U-shaped member and movable thereon, means moving the carriage on said arms, an arm extending rearwardly from the arm depending from said shaft, a connecting rod between the rear end of said rearwardly extending arm and said carriage whereby downward and rearward movement of said seat will cause said rearwardly extending arm to move said connecting rod to cause the arms of the U-shaped member to exert pressure on the shock absorber.

12. A seat for a vehicle comprising, a base including spaced uprights, a frame for said seat having side rails and a back, said back including side rails, means pivotally mounting said seat on said uprights near the forward edge of said seat, said means including a shaft pivotally mounted underneath said seat, an arm extending downwardly and rearwardly of said shaft, a shock absorber, means pivotally mounting said shock absorber on the frame of the back of the seat, a U-shaped member, a rotary shock member mounted on one of the side rails of said back, means pivotally connecting one end of said U-shaped member to said rotary shock member, said U-shaped member having arms extending toward said shock absorber, means pivotally connecting said arms to said shock absorber at substantially the vertical center thereof, a carriage having rollers engaging the arms on said U-shaped member and movable thereon, means moving the carriage on said arms, an arm extending rearwardly from the arm depending from said shaft, a connecting rod between the rear end of said rearwardly extending arm and said carriage whereby downward and rearward movement of said seat will cause said rearwardly extending arm to move said connecting rod to cause the arms of the U-shaped member to exert pressure on the shock absorber.

13. A seat for a vehicle comprising, a base including spaced uprights, a frame for said seat having side rails and a back, an upper and lower pair of arms pivotally secured to said uprights, said pairs extending upwardly of said uprights in substantially the same direction, a pair of arms pivotally mounted on the upper ends of the arms of the lower pair and having their upper ends extending forwardly and pivotally connected to the side rails of the seat frame near the forward ends thereof, the upper ends of the upper pair of arms being pivotally connected to the side rails of the seat frame at points spaced rearwardly of the pivotal connection of the forwardly extending arm, a pair of link members having their lower ends pivotally connected to the upper ends of the lower pair of the rearwardly extending arms and having their upper ends pivotally connected to the upper pair of the rearwardly extending arms at points spaced from the upper ends thereof, a shaft rigidly secured to the upper ends of the upper pair of arms, a shock absorber, means mounting said shock absorber on the back of said seat, and means connecting said shock absorber to said shaft underneath the seat whereby downward and rearward movement of the seat will cause pressure to be exerted on the shock absorber to cause resilient action on said seat.

References Cited in the file of this patent

UNITED STATES PATENTS

| Number | Name | Date |
|---|---|---|
| 2,562,041 | Keller et al. | July 24, 1951 |
| 2,598,421 | Page | May 27, 1952 |